United States Patent [19]

Legg et al.

[11] 3,889,049
[45] June 10, 1975

[54] SUBMERSIBLE CABLE

[75] Inventors: Leo V. Legg, Tulsa, Okla.; Donatas Tijunelis, Buffalo Groove, Ill.

[73] Assignee: Borg-Warner Corporation, Chicago, Ill.

[22] Filed: Jan. 14, 1974

[21] Appl. No.: 433,332

Related U.S. Application Data

[63] Continuation of Ser. No. 342,008, March 16, 1973, abandoned.

[52] U.S. Cl....... 174/102 R; 174/108; 174/110 AR; 174/110 FC; 174/113 R; 174/116; 174/120 AR; 174/120 SR
[51] Int. Cl............................ H01b 7/18; H01b 3/30
[58] Field of Search.. 174/27, 102 R, 102 D, 110 R, 174/110 AR, 110 FC, 113 R, 116, 120 R, 120 AR, 120 SR, 107, 105 R, 109, 108

[56] References Cited
UNITED STATES PATENTS

| | | | |
|---|---|---|---|
| 3,413,408 | 11/1968 | Robinson | 174/105 R |
| 3,485,939 | 12/1969 | Brown et al. | 174/107 |
| 3,710,009 | 1/1973 | Hoeg et al. | 174/120 AR |

*Primary Examiner*—A. T. Grimley
*Attorney, Agent, or Firm*—Aubrey L. Burgess

[57] ABSTRACT

An electrical conducting cable for submersible motors adapted for use in high temperature, high pressure oil wells. The cable includes separately insulated conductors disposed within an epichlorohydrin rubber jacket. The conductors are insulated with a layer of high temperature, high molecular weight, extrudable fluorocarbon, such as 1:1 copolymer of ethylene and chlorotrifluoroethylene as the primary insulation. The jacketed cable unit is protected by an outer armor formed of a suitable metal. The cable thus formed is flexible, abrasion resistant, solvent resistant, liquid impervious, heat insensitive and unaffected by well environment.

4 Claims, 4 Drawing Figures

SUBMERSIBLE CABLE

This is a continuation of application Ser. No. 342,008 filed Mar. 16, 1973 now abandoned.

BACKGROUND OF THE INVENTION

This invention relates to electrical cable, and particularly, to electrical cable utilized to deliver electrical energy to submersible motors adapted for use in high temperature, high pressure oil wells.

Submersible pumps used in oil, mineral and water wells normally include a prime mover in the form of an electric motor directly coupled to the pump and disposed deep within the well. It is necessary to provide an electrical connection between the motor and a source of electrical energy at the surface as by the use of an electrical conducting cable which extends between the source of electrical energy and the motor.

In many instances, the motors operate at relatively high power levels, in some cases exceeding 200 horsepower. Normally, the motors used are of the three-phase type and the associated cable includes three separate electrical conductors.

The electrical cable must have adequate current carrying capability and must be of sufficient dielectric strength to prevent electrical losses even under the adverse environmental conditions usually found within the well. The environmental conditions of the well vary generally depending upon geographical location. In some cases the well fluid is highly corrosive and in many instances well temperatures exceed 275°F. Most oil well fluids include brines containing dissolved $H_2S$ gas, carbonates and salts, and large volumes of oil. The fluid pressure in wells may be quite high and in many instances exceeds 4,000 psig. Additionally, the wells are quite deep, averaging 8,000 to 10,000 feet. The electrical cable must possess sufficient physical strength to allow insertion of the motor and cable to these depths and the outer surface of the cable must resist the abrasion associated with insertion. Since the cable is normally wound upon storage or transportion reels, it must possess the additional property of flexibility, so that it will resist physical damage caused by reeling.

Typical cable construction presently being utilized includes three conductors of copper separately insulated and helically wound to form a single unit. The conductors are insulated with a material of high dielectric strength such as polyethylene or polypropylene. The helically wound and insulated conductors are sheathed in an extruded jacket of nitrile rubber surrounding the insulated conductors.

One common form of jacketed cable is covered with an outer armor in the form of a continuous wrapped band of metallic material. This band is lapped as it is wound. The armor provides abrasion resistance. Usually, the armor is formed of steel or bronze; however, in many special applications, such as wells which are excessively corrosive, stainless steel or exotic metals such as monel metal must be used.

Polyethylene has also been employed to a limited extent as the outer armor, but it has been found that the same does not stand up under severely high temperatures.

Proper material selection for the cable armor has always presented difficulties. Many different armor materials must be utilized depending upon the well conditions and no single cable construction has been found suitable for universal application. This is especially true for the deep, high pressure and high temperature wells.

Electrical power cables constructed as previously described which have been used in high temperature, high pressure oil wells, fail because of temperature distortion of the thermoplastic cable components, corrosion of the armor, or chemical and solvent attack of the elastomer jacket. Since most oil wells contain dissolved $H_2S$ gas, carbonates, water, salts and large volumes of oil, no single material has heretofore been found which has the resistance to solvents, heat and pressure to operate for prolonged periods in such an environment.

An additional problem encountered by cable in such an environment is deformation under load. The cables are subject to both compressive and tensile forces and, under high temperatures, there is a marked tendency for the thermoplastic insulation to deform resulting in dislocation of the conductors and phase to phase or phase to ground short circuitry.

Rupture of the armor due to swell of the jacket is another example of deformation which occurs in such an environment. Rupture of the total construction also occurs during retraction of the cable from the well as a result of the depressurization of fluids which have permeated the cable.

These and other associated difficulties have clearly dictated the need for an improved impermeable, environment-insensitive cable construction.

SUMMARY OF THE INVENTION

The present invention relates to an improved multi-component electrical cable for submersible motors adapted for use in high temperature, high pressure oil wells. A cable constructed according to this invention comprises an outer armor of metal, an inner jacket of epichlorohydrin rubber, and a high temperature, synthetic, organic insulator surrounding the electrical conductors.

The insulator, according to this invention, is useful in high temperature, high pressure oil wells and is a high temperature, high molecular weight, extrudable fluorocarbon. A 1:1 copolymer of ethylene and chlorotrifluoroethylene is an excellent electrical insulator at elevated temperatures when unaffected by oil and brine.

The epichlorohydrin rubber used for the jacket is compounded for the minimum of oil and water permeability and swell. The epichlorohydrin rubber jacket is oil and water insensitive and impermeable providing a barrier which protects the insulation from any loss of dielectric strength and electrical protection to the conductors. Furthermore, the insulation, being temperature insensitive, will not deform and change electrical insulation thickness. The impermeability of the jacketing further insures that there be no permeating fluids to plasticize or soften the insulation and thus reduce its insensitivity to temperature deformability.

DETAILED DESCRIPTION

Figure 1:
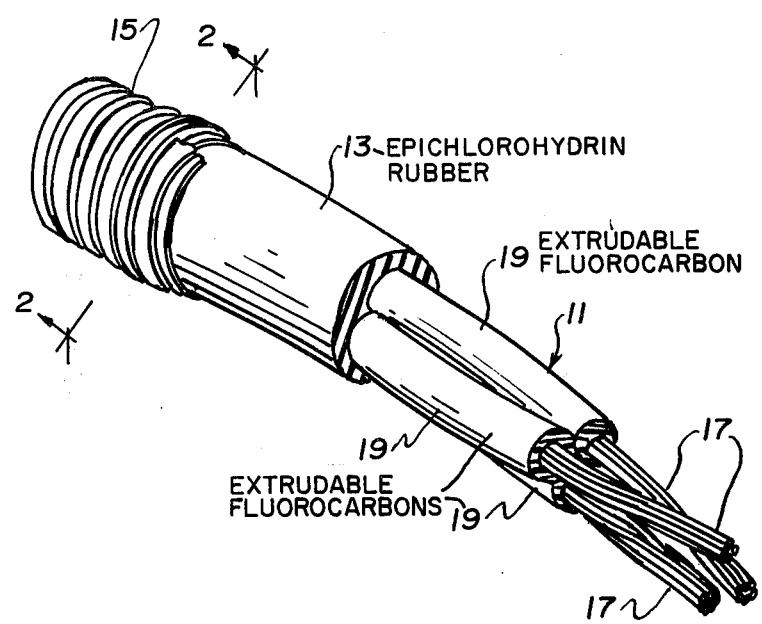
FIG. 1 is a fragmentary perspective view of a section of electrical conducting cable for submersible motors illustrating various features of the invention.
Figure 2:
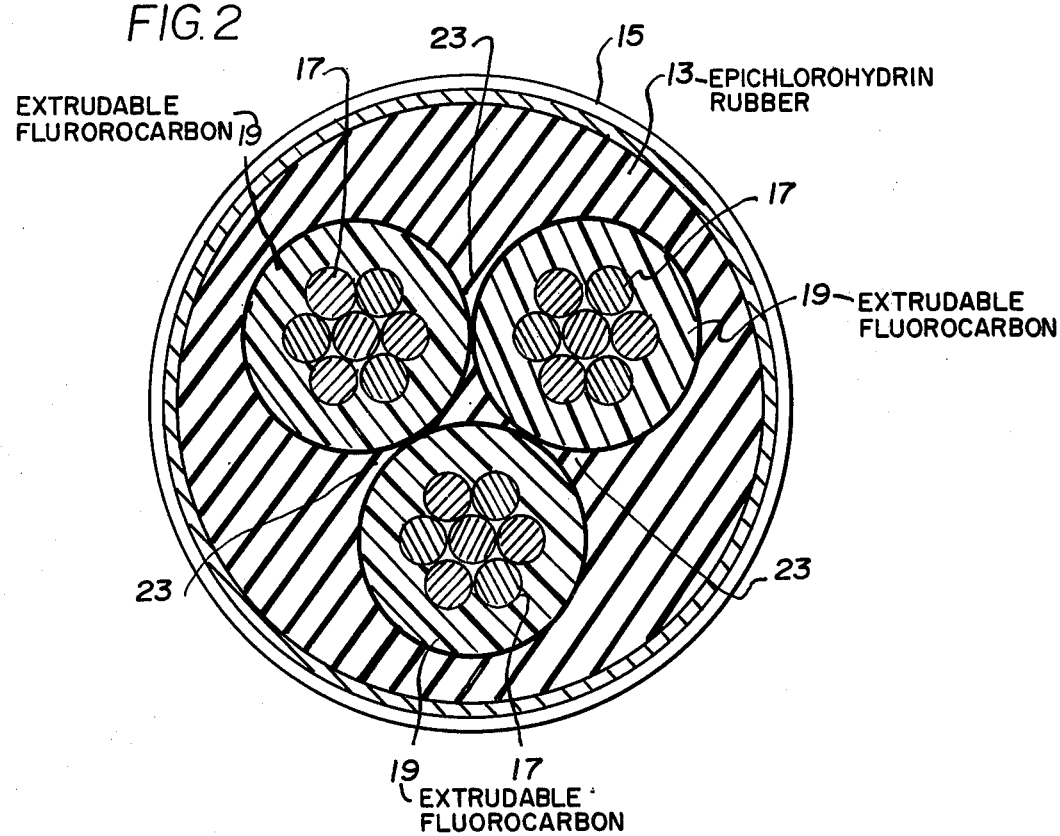
FIG. 2 is a cross-sectional view of the cable of FIG. 1 taken generally along the lines 2—2 of FIG. 1.

Referring now to the FIGS. 1 and 2 of the drawings, there is shown a multicomponent electrical conducting cable for a submersible motor designed for use in high temperature, high pressure oil wells which is illustrative of the principles of the present invention.

FIG. 1 shows a cable section which includes conductors 11, a resilient jacket 13 and an outer armor 15.

Each conductor 11 is illustrated as being formed of stranded wire 17 helically wound to prevent separation of strands. These separate strands may be tinned to minimize chemical interaction between the conductor and the insulating material. Solid conductors may be used without departing from the spirit of the invention.

In the illustrated embodiment each conductor includes seven strands. The number of conductors, the diameter of the conductor and number of wires is, of course, dependent upon the load carrying capabilities required for a particular cable application. It should additionally be noted that any suitable conducting material may be used, such as for example, copper, aluminum.

Each wound set of wire strands forms a single conductor and is separately insulated by an insulation layer 19. The conductor insulation 19 is formed of a high temperature, organic, synthetic material of high dielectric strength. A high temperature, high molecular weight, extrudable 1:1 copolymer of ethylene and chlorotrifluoroethylene has been found to be satisfactory for this purpose. The thickness of the layer 19 may have a different relationship to the dimensions of the other elements of the cable than what is inferred by the drawing. However, the drawing illustrates the various elements which make-up the cable without reference to actual dimensions.

A preferred embodiment of a high temperature, high molecular weight, extrudable 1:1 copolymer of ethylene and chlorotrifluoroethylene insulating material is commercially available under the trade name HALAR from Allied Chemical Co. This material has a formula $$(CH_2CH_2CF_2CFCl)$$

and has been found to possess the following physical properties:

| Tensile Strength | at 23°C. | 7000 psi |
| | at 340°F. | 400 psi |
| Elongation | at 23°C. | 200% |
| | at 340°F. | 350% |
| Melting Point | | 460°F. |
| Dielectric Strength Initial | | 18.7 KV |
| Dielectric Strength, 4 days at 410°F. | | 15.0 KV |
| Cut Through, 1000 g., at 120°F. | | 137 hrs. |

It will be apparent that the extrudable ethylenechlorotrifluoroethylene copolymer is particularly suited for use in cable constructions intended for applications to oil well environoments. Despite the fact of being a thermoplastic and therefore capable of melting and flowing under high temperature and pressures, it retains physical strength at elevated temperatures and dielectric strength at temperatures as high as 410°F. The resistance of the ethylene-chlorotrifluoro-ethylene copolymer to high temperature and high pressure fluid environments can also be improved by irradiation and by sheathing in an oil-and-brine resistant jacket. The comparative properties of irradiated and unirradiated films of the ethylene-chloro-trifluoroethylene copolymer are:

| | High Temperature Deformation 500 psi, 275°F. | Solvent Swell** After Exposure at 4500 psig, 275°F 7 days | |
| --- | --- | --- | --- |
| | | ASTM 1-A OIL | BRINE |
| HALAR, unirradiated | 50% elongated, broke in 1 day | 2.0% | −2.5% |
| HALAR, 10 megavad exposure* | 50% elongation, no break, 5 days | 0.5% | −0.5% |
| HALAR, 50 megavad exposure* | 10% elongation, no break, 5 days | −0.5% | 2.0% |
| High Temperature Polypropylene | 10% elongation broke first day | 40% | 1% |

*Exposure to Co⁶⁰ irradiation source.
**Per cent change in volume

It will be apparent that for use under very stringent well conditions, wire insulation will be most suited if irradiated, and the irradiated insulation is a preferred embodiment of this invention.

Further protection at the insulated wire is necessary in order that it be usefully employed over the great lengths necessary to extend to the bottoms of oil wells. In order to minimize entangling, rupture and similar damage while being installed down a well casing together with the pump motor, pump, ancilliary equipment and the production pipe, it is necessary to further jacket the insulated wire with an oil and brine-resistant outer covering. While many materials have been employed in the past for such purposes, including nitrile rubber and neoprene, and they have found general application in shallow, low temperature well environments, they have been generally unsuitable for the high temperature and high pressure deep well environments. For the practice of this invention it is essential that the flexible jacketing material resist oil and brine under the bottom hole conditions and that the wire insulation be protected to avoid permeation of gases and fluids which would cause rupture on depressurization and to avoid permeation by oil to plasticize or by water to reduce electrical resistance.

The wound conductor unit is thus disposed within the jacket 13 which is comprised of a high molecular weight epichlorohydrin rubber compounded for the minimum of oil and water permeability and swell. This jacket may be extruded about the wound conductors and preferably is formed to fill interstices 23 between adjacent conductors.

One preferred embodiment is a formulation of epichlorohydrin compounded of the materials and in approximately the ratios as follows:

| TRADE NAME | MATERIAL | PARTS/100 PARTS OF RUBBER | AVAILABLE FROM |
|---|---|---|---|
| Herclor H | High molecular weight epichlorohydrin rubber | 100.0 | Hercules, Inc. |
| Span 60 | Surface active agent comprised of partial esters of hexitol anhydrides | 1.5 | Atlas Chemical Industries |
| Dyphos XL | Di-Basic Lead Phosphite (heat stabilizer) | 10.0 | National Lead Company |
| N B C | Nickel dibutyl dithio-carbamate (anti-oxidant) | 1.0 | Du Pont |
| Cumate | Copper, dimethyl dithio-carbamate (accelerator) | 0.125 | R. T. Vanderbilt Company |
| Phenothiazine | Phenothiazine | 1.0 | Fisher Scientific Company |
| Vulcan | Carbon Black (filler) | 30.0 | Cabot Corporation |
| Hi Sil 233 | Silica (filler) | 10.0 | P.P.G. Industries |
| TE-70 | Plasticizers | 0.5 | Technical Processing, Inc. |
| TP-95 | Plasticizers | 1.0 | Thiokol Chemical Corp. |
| Azelaic Acid | Dispersant | 4.0 | Eastman Organic Chemicals |
| NA-22 | 2 mercaptothiazoline (accelerator) | 1.0 | Du Pont |

The extruded epichlorohydrin jacket completely fills the voids formed about the separately insulated conductors. This precludes exposure of the insulation to well fluid and further prevents flow of well fluid along the cable length in the event that a rupture occurs at some point along the outer armor 15 and the outer periphery of jacket 13.

The jacket 13 of the cable is surrounded by an outer armor 15 such as metal as previously stated.

Use of a multicomponent cable such as that described provides a cable construction which is abrasion resistant, impervious to well fluids, flexible and unaffected by corrosive well environments and high temperature.

A typical well cable, constructed according to the present invention, includes 3 seven-wire stranded copper conductors, each of which is surrounded by a high temperature, high molecular weight, extrudable 1:1 copolymer of ethylene and chlorotrifluoroethylene insulation having an average thickness of .010 inch to .080 inch. The separate conductors are helically wound to form a single unit. The insulated conductors are jacketed with an epichlorohydrin rubber. The jacket thickness is .040 inch minimum average. The jacket is provided with additional protection by surrounding it with a metal armor which may be wound in a conventional manner.

Figure 3:
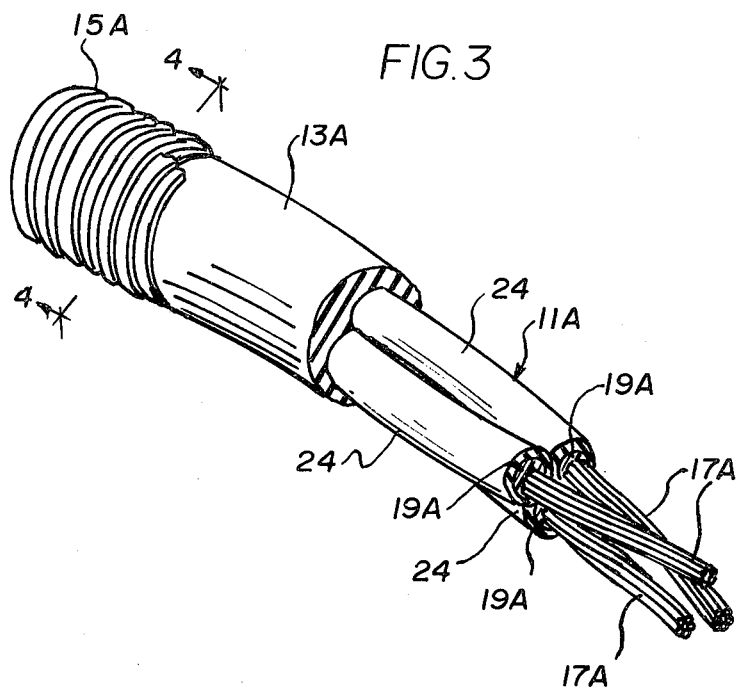
FIG. 3 is a fragmentary perspective view of a section of a second embodiment of electrical conducting cable, similar to FIG. 1.
Figure 4:
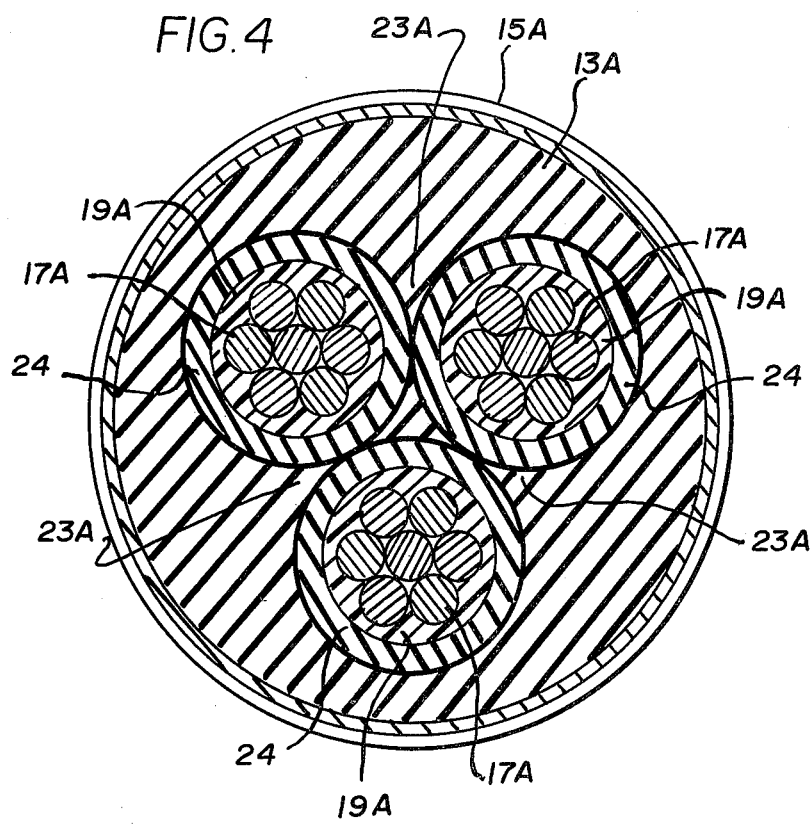
FIG. 4 is a cross-sectional view of the cable of FIG. 3 taken generally along the lines 4—4 of FIG. 3.

Another embodiment of the cable, according to this invention, is illustrated in FIGS. 3 and 4. In this embodiment, the parts are identified by a suffix A; they are the same as described with reference to FIGS. 1 and 2; however, because of the cost of the extrudable flourcarbon, the primary insulation layer 19A is quite thin and is surrounded by a secondary jacketing layer 24 of epichlorohydrin rubber of the same composition as the jacket 13 or 13A, as the case may be. This construction provides an additional protection for the primary insulation layer 19A. The second insulation layer 24 is extruded onto the insulated conductors 11A. By separating the conductors within the epichlorohydrin jacket by the secondary layer jacketing, there is protection against mechanical deformation and/or cutthrough of the insulating layer.

As can be appreciated, the cable construction of the present invention provides an efficient and durable conducting unit for use in the adverse environment associated with high temperature, high pressure oil wells.

While the epichlorohydrin rubber utilized for the jacket 13 is described as HERCLOR H (Hercules, Inc.), an epichlorohydrin homopolymer (poly (alpha - chloropropylene oxide) ), other homopolymers of epichlorohydrin such as HYDRIN 100 (B. F. Goodrich) are suitable for this application. Also epichlorohydrin rubbers prepared from epichlorohydrin and ethylene oxide are suitable for the Jacket 13. These copolymers are sold under the trade name HERCLOR C (Hercules, Inc.) and HYDRIN 200 (B. F. Goodrich).

The cable is illustrated as being substantially round in section; it should be understood that this invention also contemplates a flat cable configuration in which the conductors are in side-by-side relationship.

What is claimed is:

1. A multicomponent electrical cable for use with a submersible motor in high temperature, high pressure oil wells and in the presence of oil well fluids comprising:

at least one electrical conductor;
an extruded layer of insulating material having an average thickness of 0.010 inch to 0.080 inch surrounding the conductor;
said layer being of an extrudable fluorocarbon having a melting point of about 460°F;
a resilient fluid impervious jacket surrounding said insulating material;
said impervious jacket being of an epichlorohydrin rubber of high molecular weight protecting said extruded layer from well fluids; and
an outer armor surrounding said resilient jacket.

2. A multicomponent electrical cable as recited in claim 1 in which said outer armor is metal.

3. A multicomponent electrical conductor as recited in claim 1 in which said extrudable flurocarbon comprises a 1:1 copolymer of ethylene and chlorotrifluoroethylene having a formula ($CH_2CH_2CF_2CFCl$).

4. A multicomponent electrical cable as recited in claim 3 in which said outer armor is metal.

* * * * *